US009467388B2

(12) United States Patent
De Vuyst et al.

(10) Patent No.: US 9,467,388 B2
(45) Date of Patent: Oct. 11, 2016

(54) METHOD AND DEVICE FOR SCHEDULING DATA TRAFFIC

(71) Applicant: UNIVERSITEIT GENT, Ghent (BE)

(72) Inventors: Stijn De Vuyst, Eeklo (BE); Sabine Wittevrongel, Evergem (BE); Carl Sys, Assebroek (BE); Herwig Bruneel, Zottegem (BE)

(73) Assignee: UNIVERSITEIT GENT, Ghent (BE)

( * ) Notice: Subject to any disclaimer, the term of this patent is extended or adjusted under 35 U.S.C. 154(b) by 0 days.

(21) Appl. No.: 14/425,276

(22) PCT Filed: Aug. 13, 2013

(86) PCT No.: PCT/EP2013/066874
§ 371 (c)(1),
(2) Date: Mar. 2, 2015

(87) PCT Pub. No.: WO2014/032960
PCT Pub. Date: Mar. 6, 2014

(65) Prior Publication Data
US 2015/0263973 A1    Sep. 17, 2015

(30) Foreign Application Priority Data
Aug. 29, 2012   (EP) .................................... 12182179

(51) Int. Cl.
*H04L 12/54*   (2013.01)
*H04L 12/875*   (2013.01)
(Continued)

(52) U.S. Cl.
CPC ............. *H04L 47/56* (2013.01); *H04L 45/302* (2013.01); *H04L 47/624* (2013.01); *H04L 49/90* (2013.01); *H04W 28/26* (2013.01)

(58) Field of Classification Search
CPC . H04L 47/56; H04L 47/6215; H04L 47/622; H04L 47/624; H04L 47/625; H04L 47/627; H04L 47/6275; H04L 45/302; H04L 49/90; H04L 49/9005; H04W 28/26
See application file for complete search history.

(56) References Cited

U.S. PATENT DOCUMENTS 6,247,061 B1    6/2001  Douceur et al.
6,538,989 B1 *  3/2003  Carter ................. H04L 12/5693
                                                    370/229

(Continued)

OTHER PUBLICATIONS

Burakowski W. et al., "On New Strategy for Prioritising the Selected Flow in Queuing System ," Proc. COST 257 11th Management Committee Meeting, Jan. 20-21, 2000, Barcelona, COST-257 TD(00)03.

(Continued)

*Primary Examiner* — Kevin Mew
(74) *Attorney, Agent, or Firm* — Workman Nydegger

(57) ABSTRACT

A method is provided for scheduling data traffic in a network node. The data traffic is divided into a plurality of data traffic classes. To which data traffic class an incoming data packet belongs is detected. The incoming data packet is stored in a memory. A single queue associated with the memory is adjusted to rank the incoming data packet in the single queue between a head of the queue and a tail of the queue. The incoming data packet takes in the single queue a position corresponding to one of the reserved positions or, if no reserved position is available, taking a position at the tail of the single queue. A data packet referred to at the position closest to the head of the queue is taken for transmission. The number of reserved positions of the at least one data traffic class is determined according to a Quality-of-Service requirement.

9 Claims, 6 Drawing Sheets

(51) Int. Cl.
*H04L 12/863* (2013.01)
*H04L 12/725* (2013.01)
*H04L 12/861* (2013.01)
*H04W 28/26* (2009.01)

(56) References Cited

U.S. PATENT DOCUMENTS

| | | | |
|---|---|---|---|
| 6,765,905 B2 | 7/2004 | Gross et al. | |
| 6,977,930 B1* | 12/2005 | Epps | H04L 12/5693 |
| | | | 370/392 |
| 7,292,578 B1* | 11/2007 | Kerr | H04L 12/5693 |
| | | | 370/235 |
| 7,626,988 B2 | 12/2009 | Dennison et al. | |
| 7,680,139 B1* | 3/2010 | Jones | H04L 12/5693 |
| | | | 370/230.1 |
| 8,665,722 B2* | 3/2014 | Szymanski | H04L 12/5693 |
| | | | 370/235 |
| 2002/0141425 A1* | 10/2002 | Merani | H04L 12/5693 |
| | | | 370/412 |
| 2002/0163933 A1* | 11/2002 | Benveniste | H04L 47/10 |
| | | | 370/465 |
| 2003/0152097 A1* | 8/2003 | Makela | H04L 12/5693 |
| | | | 370/413 |
| 2003/0188065 A1* | 10/2003 | Golla | H04L 12/5693 |
| | | | 710/243 |
| 2003/0189935 A1* | 10/2003 | Warden | H04L 12/5693 |
| | | | 370/395.21 |
| 2004/0090974 A1* | 5/2004 | Balakrishnan | H04L 12/5693 |
| | | | 370/412 |
| 2005/0063402 A1* | 3/2005 | Rosengard | H04L 12/5693 |
| | | | 370/412 |
| 2008/0080382 A1* | 4/2008 | Dahshan | H04L 12/5693 |
| | | | 370/235 |
| 2009/0103491 A1* | 4/2009 | Zuniga | H04W 36/26 |
| | | | 370/331 |
| 2011/0158253 A1* | 6/2011 | Dukkipati | H04L 1/0002 |
| | | | 370/465 |
| 2012/0163205 A1* | 6/2012 | Zhang | H04L 47/14 |
| | | | 370/252 |
| 2013/0094858 A1* | 4/2013 | Raponi | H04L 47/527 |
| | | | 398/59 |

OTHER PUBLICATIONS

Burakowski et al., "Priority Forcing Scheme: A New Strategy for Getting Better than Best Effort Service in IP-Based Network," Proc. IFIP Workshop on Internet Technologies WITASI 2002, Oct. 10-11, 2002, Wroclaw, pp. 135-150.

International Search Report for corresponding International PCT Application No. PCT/EP2013/066874, Sep. 16, 2013.

Maertens et al., "On Priority Queues with Priority Jumps," Performance Evaluation, vol. 63, No. 12, Dec. 1, 2006, pp. 1235-1252.

Sumita, "Approximation of the Mean Waiting Time in a Finite Buffer Queue with a Combination of HOL-Priority and Buffer-Reservation Schemes," IEICE Trans.Comm., vol. E86-B, No. 11, Nov. 2003, pp. 3283-3287.

* cited by examiner

METHOD AND DEVICE FOR SCHEDULING DATA TRAFFIC

FIELD OF THE INVENTION

The present invention is related to the field of fair provisioning of Quality-of-Service among heterogeneous traffic classes in packet-based networks. More in particular, it relates to solutions for scheduling multi-class traffic in network nodes.

BACKGROUND OF THE INVENTION

A node is considered in a packet-based communication network. In the node all incoming packets with the same next-hop destination must be transmitted over a single output line towards the next node. Because of the limited bandwidth, an output queue is necessary to resolve contention at the output link. Current networks convey very diverse and heterogeneous traffic and should therefore be able to differentiate the Quality of Service (QoS) according to the specific needs of the individual traffic streams, i.e. deliver a better service for those applications that need it, in exchange for a worse service for other applications. This means the network nodes must be QoS-aware systems that treat packets differently depending on the application they belong to. In the DiffServ framework for IP (Internet Protocol) networks, traffic streams are aggregated into a limited number M of traffic classes (TC), based on the DSCP (Differentiated Services Code Point) field in the IP header, and the handling of packets depends on the traffic class they belong to. Many QoS-aware algorithms exist, both at the application level (e.g. traffic shaping, congestion notification) and at the level of the network (e.g. congestion avoidance, active queue management, specific packet discarding and packet scheduling mechanisms). In the present invention the focus is on the latter, i.e. the scheduling algorithm for the packets in the queues of the output links.

A router's scheduling algorithm is responsible for determining which available packet is the next to be transmitted to the output link. The key technical challenge is to schedule packets in such a way that the joint QoS requirements of the different traffic classes are met as closely as possible, given a certain limited output bandwidth. Targeted QoS criteria usually are per-class output bandwidth, mean packet delay, delay jitter and packet loss probability. QoS provisioning further entails the amount of isolation, fairness, policing and the degree in which these service levels can be guaranteed and enforced.

There exists no single algorithm that can guarantee an ideal distribution of resources in all possible circumstances and under all output bandwidth constraints. Any measure taken to enhance a QoS criterion for one class necessarily degrades the performance of other classes to some extent. This allows for a fair amount of QoS tailoring: performance with regard to a high-utility criterion can be improved at the cost of a worse performance for low-utility criteria. Therefore, scheduling is always a matter of aiming for an agreeable trade-off in satisfying the targeted QoS requirements of the different traffic classes. Seen in this way, any particular scheduling mechanism implements only a subset of the possible ways in which multi-class scheduling can be done, thus covering only part of the possible trade-off choices that can be made. Some of them focus particularly on minimising delay, some on proportionally sharing the output bandwidth, some on meeting strict deadlines and others specifically on the fairness between classes. Usually, however, a mechanism involves changes in several of these aspects.

Various multi-class scheduling mechanisms for packet-based networks have been proposed in the past and some of them are extensively used in present-day routers. In the realm of class-based scheduling the main classical players are the following.

Absolute priority (AP), which is also known as Head-of-Line (HoL), provides an extreme QoS trade-off in the sense that minimising the delay of class-i packets (i=1, . . . , M) is infinitely more important than the delay of packets of class i+1, . . . , M. A separate queue for each class is used and the scheduler always visits the queue that has the lowest class number and is non-empty. The drawback of AP is that no control over the QoS differentiation is possible and that it is only practical for few classes with clearly distinct service requirements. Additionally, classes with lower priority may experience a dramatically high delay, especially when the partial load of the higher-priority classes is high, an effect known as packet starvation.

Some modifications to soften the rigidity of AP have been proposed. A Probabilistic Priority scheme has been presented that assigns a small probability $p_i$ to each class by which the server may service a class-(i+1) packet, even though class-i packets are available. Another idea was to allow packets to promote to a higher-priority class under certain well-specified conditions, or conversely, to degrade to a lower class (priority jumps, see e.g. patent document U.S. Pat. No. 6,765,905 B1). Nevertheless, the resulting per-class delay distributions of these solutions are poorly understood and rules to translate delay targets to working parameters are lacking.

Proportional-rate schedulers (also called fair-queueing schedulers (FQ)) consider it fair to guarantee each traffic class a predefined fraction of the output bandwidth. In other words, FQ-schedulers assign the available output rate proportionally, in line with the Proportional-DiffServ framework for QoS provisioning in IP networks. Implementations always use a separate queue for each traffic class (as does AP) and dequeueing is done by visiting these queues in some periodical manner (or otherwise) such as to guarantee rate-proportionality as much as possible. Weighted Fair Queuing (WFQ) optimally achieves proportionality but is computationally very complex, as it needs to recalculate virtual finish times for all queues each time a packet is either enqueued or dequeued anywhere. Many modifications exist: start-time Fair Queueing, self-clocked Fair Queueing, worst-case Fair Weighted Fair Queueing, frame-based Fair Queueing, Weighted Round-Robin, Deficit Round-Robin (DRR), all of which have their specific advantages.

Deadline-based schedulers require each packet to have a strict deadline by which that packet should have been transmitted at the very latest. The QoS provisioning is considered fair as long as all deadlines can be met. If a packet cannot be transmitted before its deadline, the time it is overdue is defined as its lateness. The Earliest Deadline First (EDF) scheduler always transmits the packet with the nearest deadline and is known to achieve the smallest possible overall lateness. The drawback of such deadline-based schedulers, however, is their need to maintain a priority list of all queued packets, resulting in a high complexity. Some patented deadline-based solutions are found in U.S. Pat. No. 7,626,988 and U.S. Pat. No. 6,247,061. Particularly noteworthy is U.S. Pat. No. 7,626,988, which uses separate queues to represent future time quanta, rather than a priority or a flow. A packet is enqueued in that queue which corresponds to the amount of time left before the packet's deadline. This results in a kind of time/space interaction with a QoS target expressed in terms of said future time quanta. As with previous solutions, the actual per-class delay distribution, or even the per-class lateness, of deadline-based schedulers is hard to control or predict. Hence, delay quantile proportionality is not achieved with deadline-based schedulers.

Some solutions try to combine aspects of the above main solution types in order to exploit their advantages under specific conditions or for specific applications. Schedulers have been proposed that modify DRR (fair queueing) to include priority for delay-critical flows. Likewise, fair queueing has been used whereby flows with low enough actual rate compared to their fair share are given absolute priority.

Also the use of in-queue reservations has been described in the prior art. In the paper "*Priority Forcing Scheme: a New Strategy for Getting Better than Best Effort Service in IP-Based Network*" (Burakowski et al., Proc. IFIP Workshop on Internet Technologies WITASI 2002, 10-11 Oct. 2002, Wroclaw, pp. 135-150) a Priority Forcing Scheme (PFS) is suggested. This scheduler requires the involved applications to make the reservations by sending reservation packets through the network in advance of data packets which contain the actual data. Only network users (applications) that are aware of the Priority Forcing Scheme used in the network nodes can benefit from it. It is also clear that malicious users can easily flood the network with reservation packets, thereby gaining access to all of the resources at the expense of the other users. With PFS, once a reservation packet is seized by a data packet, no new reservation is made. In "*On New Strategy for Prioritising the Selected Flow in Queuing System*" (Burakowski W. et al., Proc. COST 257 11th Management Committee Meeting, 20-21 Jan. 2000, Barcelona, COST-257 TD(00)03) a queueing system with two traffic classes and a single reservation for the high-priority class is described (wherein the reservation is reused). The resulting delay differentiation is therefore very small, static and uncontrollable.

In the prior art no scheduling algorithm is described that allows shaping the distribution of the queueing delay perceived by each traffic class with regard to their quantiles. With the $\alpha$-quantile of the delay d perceived by the packets (of a certain traffic class) is meant the value $d^\alpha$ so that a fraction $\alpha$ of the packets have a delay of at least this value, i.e. $\mathrm{Prob}[d \geq d^\alpha]=\alpha$. Further it is desirable to have a scheduling algorithm that allows for early provision of tight delay bounds.

Hence, there is a need for a scheduling mechanism that meets such requirements.

In the paper '*Approximation of the Mean Waiting Time in a Finite Buffer Queue with a Combination of HOL-priority and Buffer-Reservation Schemes*' (S. Sumita, IEEE Trans. Comm., vol. E86-B, no. 11, November 2003, pp. 3283-3287) delay priority and loss priority are controlled by head-of-line priority scheduling and buffer reservation. The proposed approximation is based on the known results on a HoL-priority queue with infinite buffer and a finite buffer queue with FIFO scheduling and buffer reservation.

SUMMARY OF THE INVENTION

It is an object of embodiments of the present invention to provide a method for data traffic scheduling in a network node, the data traffic being divided into a plurality of data traffic classes, that offers a network administrator the possibility to shape the distributions of the queueing delay of the various traffic classes. It is a further object to provide a method for data traffic scheduling that allows for early delay bound estimation.

The above objective is accomplished by the solution according to the present invention.

In a first aspect the invention relates to a method for scheduling data traffic in a network node, whereby the data traffic is divided into a plurality of data traffic classes. The method comprises the steps of:
 detecting to which data traffic class an incoming data packet belongs,
 storing the incoming data packet in a memory and adjusting a single queue associated with said memory to rank the incoming data packet in the single queue between a head of the queue and a tail of the queue, said single queue having for at least one data traffic class a number of reserved positions for arriving data packets of said at least one data traffic class, whereby the incoming data packet takes in the single queue a position corresponding to one of the reserved positions or, if no reserved position is available, takes a position at the tail of the single queue, and
 taking the data packet referred to at the position closest to the head of the queue for transmission.

The method is characterised by a step of determining the number of reserved positions of the at least one data traffic class according to a given Quality-of-Service requirement relating to a queueing delay distribution of data packets of the at least one data traffic class having reserved positions in the single queue, whereby said determining comprising a computation based on a given spacing between quantities representative of said queueing delay distribution.

The proposed method indeed meets the above-mentioned goals. By providing traffic class specific reserved positions in the single queue the delay distribution functions can be shaped by properly determining the number of reserved positions for the various traffic classes. The step of determining the number of reserved positions can be executed prior to operation or during operation, e.g. when the Quality-of-Service requirements change.

The data packet selected for transmission is the data packet at the head of the single queue. However, it may be that at the head of the queue there are some reserved positions. In such a scenario it is the data packet closest to the head that will be transmitted next.

In one embodiment the quantities representative of said queueing delay distribution are per traffic class delay quantiles, whereas in another embodiment said quantities are per traffic class mean delays.

In another preferred embodiment a new reserved position is created at a free position towards the tail of said queue when a position corresponding to one of said reserved positions is taken by an incoming data packet belonging to a traffic class having reserved positions, so that the number of reserved free positions for that class remains constant. By providing this step in the method the number of available reservations for the traffic class in question is kept constant at all times. Note that in this embodiment incoming packets do not take a position at the tail of the single queue anymore.

In an advantageous embodiment said position corresponding to one of said reserved positions is the available reserved position closest to the head of the single queue. This is a very simple way of choosing a reserved position. A more complex algorithm to decide on the reserved position an incoming packet should seize, is based on a probabilistic reservation seizing rule.

In yet another preferred embodiment of the invention, before said step of storing and adjusting a step is performed of estimating the queueing delay for the incoming data packet. Obtaining this additional piece of information can be advantageous when gathering congestion info of the network. Based on the information it may e.g. be decided not to enqueue an arriving packet of data. Advantageously said queuing delay estimation comprises an upper bound and a lower bound estimate.

The invention also relates to a program, executable on a programmable device containing instructions, which, when executed, perform the method as previously described.

In another aspect the invention relates to a device for scheduling data traffic in a network node, said data traffic being divided into a plurality of data traffic classes. The device comprises:

a memory for storing an incoming data packet, a single queue associated with said memory arranged to rank the incoming data packet between a head of the queue and a tail of the queue, said single queue having for at least one data traffic class a number of reserved positions for arriving data packets of the at least one data traffic class, whereby the incoming data packet takes in the single queue a position corresponding to one of the reserved positions or, if no reserved position is available, a position at the tail of the single queue, and control means arranged for detecting to which data traffic class the incoming data packet belongs, for enqueueing the incoming data packet in the memory and for selecting a data packet referred to at the position closest to the head of the queue for transmission over an output link, characterised in that the control means is further arranged for determining the number of reserved positions of the at least one data traffic class according to a given Quality-of-Service requirement relating to a queueing delay distribution of data packets of the at least one data traffic class having reserved positions in the single queue, said determining comprising a computation based on a given spacing between quantities representative of said queueing delay distribution.

Preferably the control means is adapted for deriving parameter settings from the given Quality-of-Service requirement and for determining the number(s) of reserved positions also based on the derived parameter settings.

In an embodiment of the invention the control means is further adapted for performing a queueing delay estimation for the incoming data packet.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
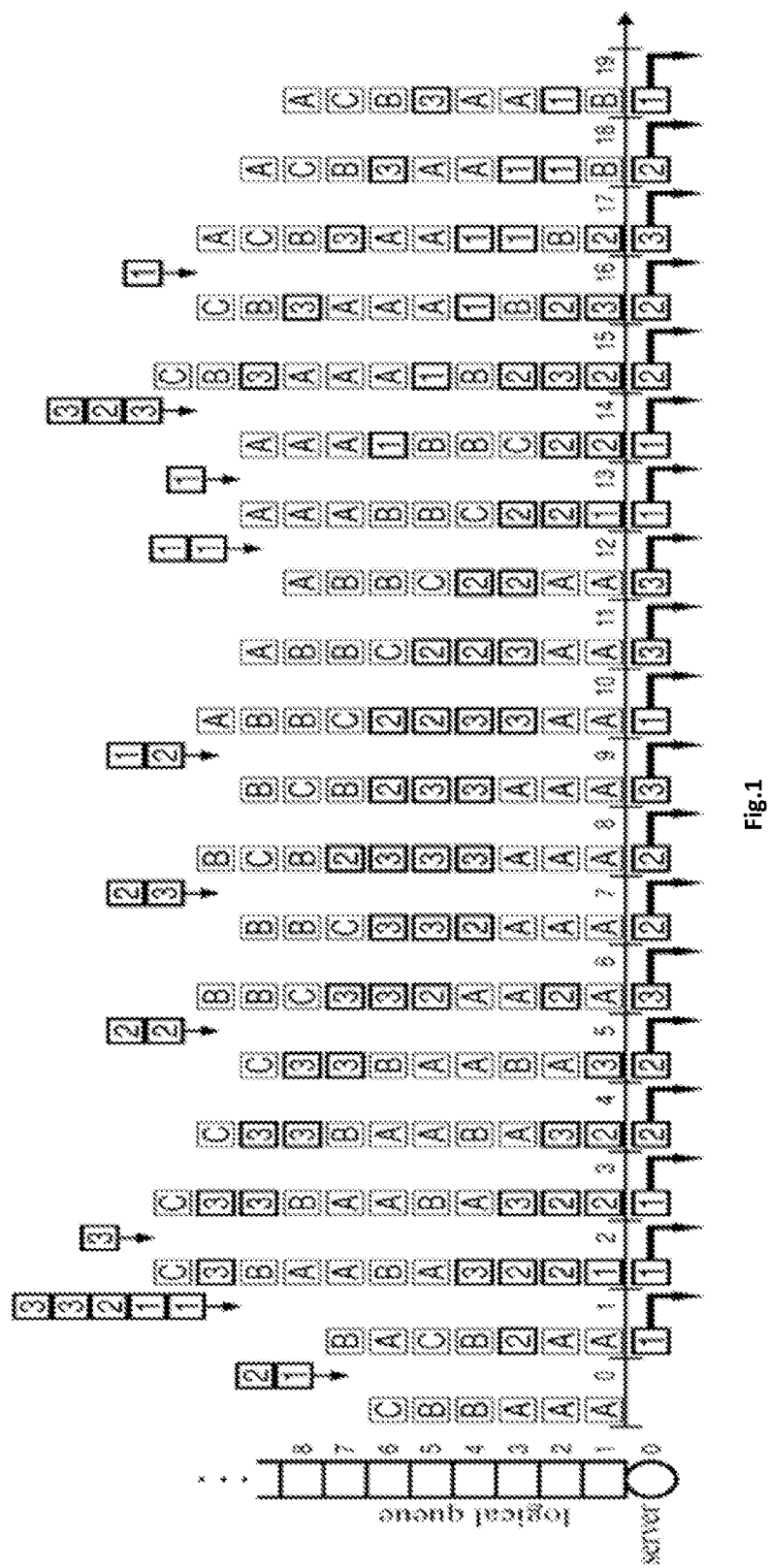
FIG. 1 represents a queue with a scheduling scheme with reserved positions according to an embodiment of the invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention basically relies on a so-called R-scheduling mechanism, which is clearly distinct from any existing technique (e.g. those mentioned in the background section). The term 'R-scheduling' refers to the fact that one employs reserved positions in a queue for future arriving packets of at least one of the data traffic classes, as detailed further in this description. The algorithm is primarily designed for shaping the distributions of the queueing delay perceived by each traffic class (TC), mainly with regard to their quantiles. If a certain spacing of these quantiles is targeted (e.g. in case of two traffic classes, the 5%-delay quantile of TC1 must be 25 ms smaller than the 5%-delay quantile of TC2 packets), setting the parameters of R-scheduling accordingly achieves this. This main functionality of R-scheduling is referred to as delay quantile spacing. However, other possible features that can be effectuated by R-scheduling comprise isolation through temporal priority, mitigation of starvation, early provision of (possibly tight) delay bounds.

In the proposed scheduling algorithm, a single queue is used to store the data packets of all traffic classes, contrary to most prior art solutions. The queue can contain any given number of reserved positions (R) for future arriving packets. At least one TC has a class-specific number of its own reserved positions at hand, depending on which kind of delay differentiation between the TCs is targeted and to which degree. In most practical cases, however, several (possibly even all) traffic classes have their specific number of reserved positions. If a packet of a traffic class for which reserved positions are available, is enqueued, it seizes a reserved position R by taking its place in the queue, after which—in certain embodiments—a new reserved position R belonging to the same traffic class as the enqueued packet is created at the tail of the queue. The reservations R are merely placeholders but behave in the queue as normal packets do, although they cannot be dequeued. If there is no reservation available for the incoming packet, it takes a position at the end of the single queue.

As will be explained in detail below, an important part of the invention relates to a solution for translating the user's QoS targets into working parameters for the scheduler. Further, a solution is presented to predict a packet's delay before it is enqueued.

A main application field of the proposed R-scheduling mechanism concerns routing in packet-switched networks. It is to be noted, however, that the described mechanism is generic in nature and not limited to this specific application alone. Other applications may be found in the handling of data requests, queries, transactions, prioritizing processes and/or threads and/or network traffic, and even in enqueueing physical items (manufacturing, packaging, distribution).

The invention proposes a novel way of scheduling multi-class traffic in network nodes (typically QoS-aware IP routers). A router's scheduling algorithm is responsible for determining which available packet is the next to be transmitted to the output link. The key technical challenge then is to schedule packets in such a way that the joint QoS requirements of the different traffic classes are met as closely as possible, given a certain limited output bandwidth. Targeted QoS criteria usually are per-class output bandwidth, mean packet delay, delay jitter and packet loss probability. With R-scheduling, one can add per-class delay quantiles to this list. QoS provisioning further entails the amount of isolation, fairness, policing and the degree in which these service levels can be guaranteed and enforced.

Instead of using dedicated queues for the TCs, in the present invention a single queue is used in which all incoming packets are ranked. Besides the packets themselves, the queue can also contain reserved places or reservations (R). For at least one of the traffic classes one or more reserved places in the single queue are available. Preferably, for each traffic class i (i=1, ..., M) a number of reservations $N_i$ is allocated in the queue. The assigned numbers of reserved places are thus given by M numbers of reservations $N_1, ..., N_M$. So, if $N=N_1+...+N_M$ then an empty queue (i.e. without data packets) would contain reservations in the first N positions. Arriving data packets are enqueued in either of two manners:

(1) the packet seizes one of the reservations of its class, or
(2) the packet is placed at the end of the queue in the usual FIFO way.

Seizing a reserved position R of TC i at a certain position means that a packet of traffic class i is stored in this position and that, optionally, a new class-i reservation R is made at the lowest free position at the end of the queue. This way, it is assured that the number of class-i reservations is always kept constant.

Various Reservation Seizing Rules (RSR) can be applied for choosing a reservation of type i. A probabilistic RSR would be to choose the $k^{th}$ reservation of traffic class i with probability $p_{i,k}$ (with i=1, ..., M and k=1, ..., $N_i$), with particular implications for the QoS differentiation. However, a more obvious RSR is to simply take the lowest possible position, i.e. the first available reservation in the queue. This reservation seizing rule (called minimum RSR or MRSR) is assumed in the remainder of this description.

If at a certain time the output link becomes available, a packet from the queue is selected for transmission. This will be the data packet with the lowest position in the queue (i.e. at the position closest to the head of the queue), say at position n. The chosen packet is dequeued and all entries (both data packets and reservations) with positions higher than n shift one position to close the gap. FIG. 1 provides an illustration of a queue with R-scheduling according to the invention. In the example there are M=3 traffic classes, depicted with numbers 1, 2 and 3, respectively. The first traffic class has three reserved positions (depicted with letter A), the second traffic class has two reservations (depicted with letter B) and for the third class there is a single reserved position (depicted with letter C). Arriving packets are assumed to seize the first available reserved place in the queue for the corresponding class, as explained above.

With the aid of FIG. 1 a more detailed description of the R-scheduling discipline is given. In FIG. 1 the horizontal axis is the time axis, divided in slots. The queue (and server) content is given at the beginning of each slot. Packets in the queue are waiting for transmission. If there is a packet in the server during a time slot, then this packet is transmitted during said time slot. The seizing rule is MRSR. The service time is one slot. At the beginning of time slot 0, there are no packets in the queue. Thus the queue consists only of reservations; there are six reservations ($N_1+N_2+N_3=6$). The TC1 reservations are in the three lowest positions; the TC2 reservations occupy positions four and five; the TC3 reservation is at the sixth position. During time slot 0, two packets arrive, first a TC1 packet, then a TC2 packet. At the end of time slot 0 the queue length will be eight (six reservations and two packets). The arriving TC1 packet takes the first TC1 reservation, i.e. the first position in the queue, and a new TC1 reservation is added at the end of the queue (i.e. at position seven). Then the TC2 packet arrives and takes the first TC2 reservation, i.e. the fourth position in the queue, and a new TC2 reservation is added at the end of the queue (i.e. at position eight).

At the end of time slot 0, the queue contains the TC1 packet at the head of the queue, followed by two TC1 reservations, followed by the TC2 packet, one TC2 reservation, the TC3 reservation, a TC1 reservation and finally the TC2 reservation. At the start of time slot 1, the first packet in the queue, the TC1 packet, is served and all the other packets and reservations shift one position towards the head of the queue.

At the beginning of time slot 1, the queue length is seven: six reservations (the number of reservations does not change) and one TC2 packet. During time slot 1, five packets arrive, first two TC1 packets, then one TC2 packet and finally two TC3 packets. At the end of time slot 1, the queue length will be twelve: six reservations and six packets. During time slot 1, the following changes in the queue appear:

the first TC1 packet seizes the TC1 reserved position closest to the head of the queue; this is the first position in the queue. A new TC1 reservation is created at the end of the queue (position eight);

the second TC1 packet seizes the TC1 reservation closest to the head of the queue; this is the second position in the queue. A new TC1 reservation is created at the end of the queue (position nine);

the TC2 packet seizes the TC2 reservation closest to the head of the queue; this is the fourth position in the queue. A new TC2 reservation is created at the end of the queue (position ten);

the first TC3 packet seizes the (only) TC3 reservation; this is the fifth position in the queue. A new TC3 reservation is created at the end of the queue (position eleven);

The second TC3 packet seizes the (only) TC3 reservation; this is the eleventh position in the queue. A new TC3 reservation is created at the end of the queue (position twelve).

At the end of time slot 1, the queue consists of two TC1 packets, followed by two TC2 packets, followed by a TC3 packet, followed by a TC1 reservation, followed by a TC2 reservation, followed by two TC1 reservations, followed by one TC2 reservation, followed by a TC3 packet, and finally the TC3 reservation.

At the start of time slot 2, the first packet in the queue, the TC1 packet at position one, is served and all the other packets and reservations shift one position towards the head of the queue.

The packet chosen for service need not be at the head of the queue. At the start of time slot 7, the first packet is at position two (a TC2 packet); at position one there is a TC1 reservation. Clearly, the TC2 packet is chosen for service, the TC1 reservation at position one remains at that position, and the rest of the queue shifts one position towards to the head of the queue. Similarly, at the start of time slot 8, the first three positions—TC1 reservations—remain unchanged, the TC2 packet from position four is selected for service and all packets and reservations further in the queue (position five and higher) shift one position towards the head of the queue.

Figure 2:
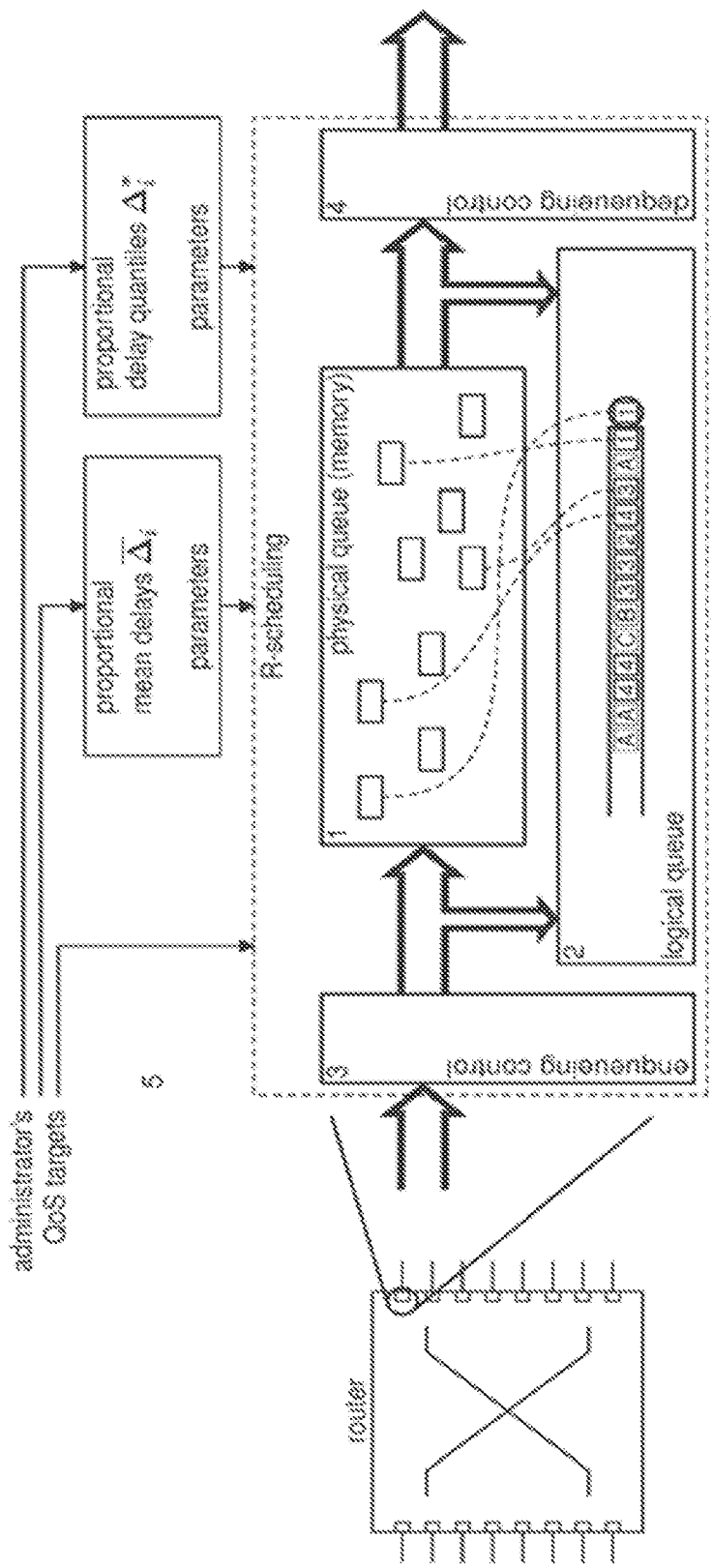
FIG. 2 shows a block diagram of the different components according to an embodiment of the invention.

In a preferred embodiment a scheduler according to the present invention comprises the following components (FIG. 2). A physical queue (1) with random access memory is provided for dynamic storage of the data packets, with necessary logic (read/write/remove packets, compaction, etc. . . . ). Further there is a logical queue (2), i.e. a dynamic data structure representing a queue with fixed-size entries. An entry can contain either a reference to a packet stored in the physical memory or a reservation R with an indication of its level. Optionally, to deal with the finite size of both the physical and the logical queue, any existing intelligent packet discarding policy can be implemented. Enqueueing control means (3) receives the incoming packets and stores them into the physical data memory with proper adjustment of the single logical queue. The control means is also adapted for performing dequeueing, wherein the packet in the memory referred to at the position closest to the head of the logical queue is selected and transmitted over the output link. The packet is then properly removed from the data memory and associated logical queue. The control means can be split in enqueueing control means (3) and dequeueing control means (4) as shown in FIG. 2. Alternatively the functions of enqueueing control and dequeueing control can be integrated in a single control block.

The control means is further arranged for enabling translation of an administrator's QoS targets into a set of working parameters, i.e. it can determine the number(s) of reservations $N_i$ (i=1, . . . , M) such that a desired differentiation of the per-class delay distributions is achieved. Which translation rules to use depends on how the desired differentiation is formulated.

Suppose the delay perceived by class-i traffic is denoted as the random variable $d_i$, with mean $\bar{d}_i$ and α-quantile $d_i^\alpha$. As shown in FIG. 2, the parameters can be set directly by the administrator or be derived from given spacing targets $\Delta_i$, either for the per-class delay α-quantiles $d_{i+1}^\alpha - d_i^\alpha = \Delta_i^*$. (preferably) or in terms of relative per-class mean delays, $\bar{d}_{i+1} - \bar{d}_i = \bar{\Delta}_i$ (more difficult, but still feasible). The translation rules may also be influenced by the QoS differentiation application or QoS goal the administrator is trying to achieve. The proposed R-scheduling approach works particularly well for several such goals:

mitigation of packet starvation in Absolute Priority (AP) systems fine-tuned differentiation between several traffic classes of comparable importance (e.g. multimedia classes with different profiles or tariffs), with specific QoS spacing targets isolation of classes. Since each class has its own dedicated reservations, it is protected from packet flooding by other classes. The higher the number of reservations of a particular traffic class, the more severe its isolation.

In a preferred embodiment the control means is further arranged for estimating the total queueing delay of packets before they are enqueued. Having such an early estimate can be advantageous in several ways. It can be used to gather congestion information of the network that can be used locally or globally in the network. It can e.g. be used for packet discarding (similar to Random Early Detection) by deciding not to enqueue at all an arriving packet with a large foreseen delay. The delay information can also be sent back to the source in order to warn for imminent upstream congestion (similar to TCP). Preferably a three-point estimation is used: a lower bound (best-case), upper bound (worst-case) and best estimate. These bounds can be provided because a single queue is used for R-scheduling (contrary to most prior art). An enqueued packet P sees a number of packets and reserved places in front of itself in the queue. The lower delay bound corresponds to the sum of the sizes of these packets and thus assumes the possibility that none of the reserved positions ahead of P will be seized prior to the transmission of P. The upper delay bound on the other hand accounts for the worst-case where all of those reservations are seized by packets. So, in case the number of reservations ahead of arriving packet P is relatively small (usually so for packets of higher-priority traffic classes), both bounds may be very close together. Using a probabilistic algorithm one can calculate a best delay estimate for P by predicting the number of reservations ahead of P that will be seized. Optionally, per-class traffic measurements can be used to enhance this prediction.

The derivation of delay bounds will be illustrated with the example in FIG. 1. Delay bounds for both TC3 packets arriving during time slot 1 will be derived. The first TC3 packet seizes the fifth position in the queue. The positions one to four are already occupied by packets. Thus, these four packets (no more, no less) will be served before the first TC3 packet. Therefore, the waiting time (or delay) of that packet will be four slots and it will be served five slots later, i.e. during slot 6. The second TC3 packet seizes the eleventh position in the queue. The first ten positions are occupied by five packets and five reservations. Thus at least these five packets (if none of these five reservations are taken) and at most ten packets (if all of these five reservations are taken) will be served before the second TC3 packet. The lowest possible waiting time is five slots; in that case, the packet will be served six slots later (during slot 7). The longest possible waiting time is ten slots. In that case, the packet will be served eleven slots later (during slot 12). In the example of FIG. 1 two (TC2) packets seize reservations closer to the head of the queue than the second TC3 packet. The actual waiting time of the second TC3 packet is seven slots; the packet will be served during slot 9.

Figure 3:
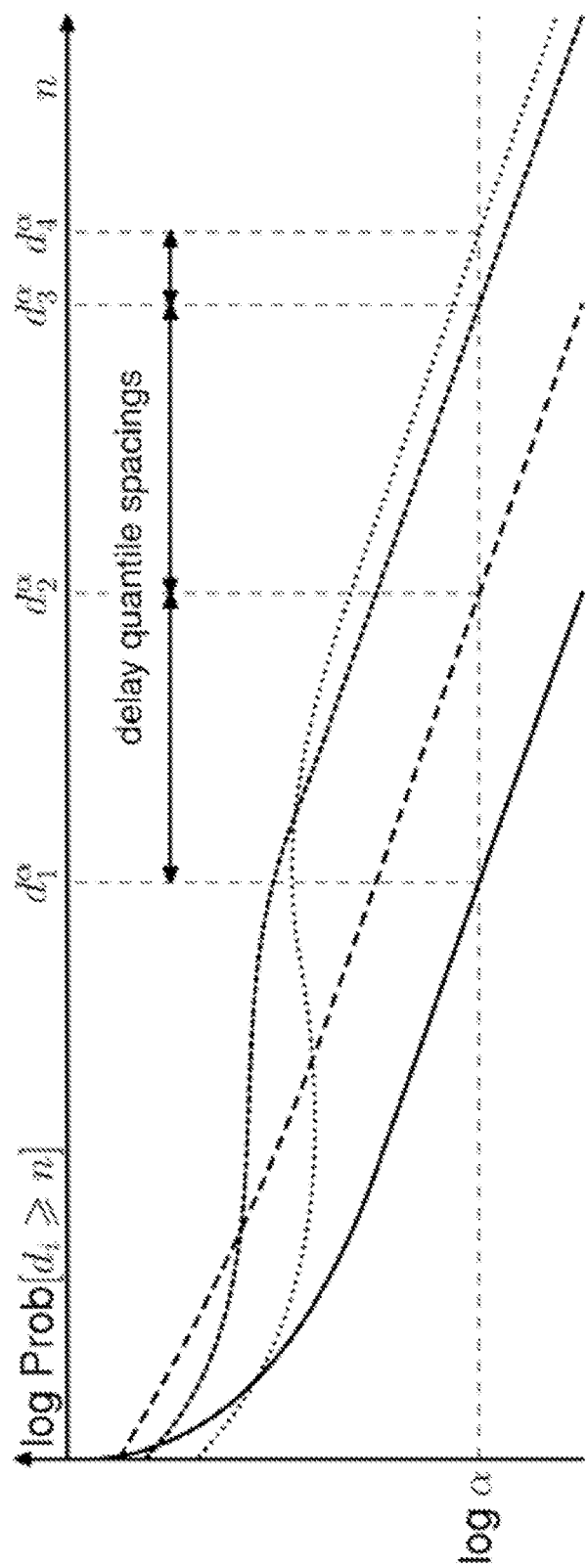
FIG. 3 illustrates schematically an attractive property regarding the tail behaviour of the per-class delay distributions, namely the decay rate of the tails is the same for all classes.

R-scheduling exhibits an attractive statistical property regarding the tail behaviour of the per-class delay distributions. It turns out that the decay rate of the tails is the same for all classes and equal to the decay rate in the equivalent FIFO system (i.e. if no QoS-aware scheduling were used): $\log(\text{Prob}[d_i > n]) \propto r_{FIFO} \cdot n$. Therefore, for small enough $\alpha$ (5%, 1%, . . . ), the difference between the delay $\alpha$-quantiles of traffic classes i and i+1 is independent of $\alpha$. The spacings $\Delta_i^* = d_{i+1}^\alpha - d_i^\alpha$ between the delay $\alpha$-quantiles of different traffic classes are therefore independent of $\alpha$ and can be controlled by adjusting the numbers of reservations of the traffic classes i and i+1 (see below). FIG. 3 provides a schematic illustration of this property for a system with four traffic classes.

This property ensures an asymptotic delay fairness between the traffic classes that can be smoothly controlled. Additionally, the fact that all traffic classes have their delay distributions decaying at the same rate prohibits a situation where some unfortunate classes have extremely slow decaying delay tails, viz. excessively high delay quantiles $d_i^\alpha$ manifested by the phenomenon of packet starvation for these traffic classes.

It is to be noted that the derivation of the number of reserved positions per traffic class requires solving a very complex problem. A typical setting is a network node in a packet-based communication network with M traffic classes. Traffic classes are modelled as independent Poisson arrival processes. The total load is denoted L and the partial load of traffic class $L_i$, i=1, . . . , M. The differentiation between traffic classes, the QoS, is given in terms of the M−1 delay quantile spacings: $\Delta_1^*, \Delta_2^* \ldots, \Delta_{M-1}^*$. The number of reservations for traffic class i needed to meet the QoS requirements (i.e. the delay quantile spacings) in a given network node setting (i.e. the partial loads) is a function of 2M−1 parameters:

$$N_i = f_i(L_1, L_2, \ldots, L_M, \Delta_1^*, \Delta_2^*, \ldots, \Delta_M^*), i=1, \ldots, M$$

Often relative loads (RL) instead of partial loads are used to describe the network setting. The relative load is the ratio of the partial load to the total load:

$$RL_i = \frac{L_i}{L}.$$

Any combination of M−1 relative loads and the total load may equally well be used to describe the network node setting.

There is no analytical solution to this problem apart from the too restricted, special case of two traffic classes with independent Poisson arrivals, fixed service times and reserved positions for only one traffic class. With the aid of computer simulations, approximating formulas for the functions $f_i$, i=1, . . . , M have been derived. As will be shown in detail below, extensive simulations for a wide parameter space (number of traffic classes, number of reservations for each traffic class, total system load, partial load for each traffic class) have led to the observation that the solution to that complex problem is surprisingly simple.

A prevalent computer simulation for a network node with R-scheduling discipline takes the numbers of reservations and the partial loads as input. Instead of M partial loads, the total load and M−1 relative loads may be used. In any case, there are 2M input parameters. Output information may be (distribution of) delay, (distribution of) queue length, packet loss, . . . . The distribution of the delay is of particular interest now: delay quantiles and delay quantile spacings are extracted from the delay distribution.

One simulation will result in delay quantile spacings for a particular combination of loads and of numbers of reservations of the traffic classes. Many simulations are needed to get insight in the dependence of delay quantile spacings on a particular parameter. Some of the questions to solve are:

how does a variation in number of reservations of one traffic class, keeping all other parameters unchanged, change the delay quantiles of that traffic class?

how does it affect the delay quantiles of other traffic classes?

how does it affect other traffic classes with high load?

how does it affect other traffic classes with low load?

how do the delay quantiles (delay quantile spacings) change if the numbers of reservations of all traffic classes are augmented (or multiplied) with a fixed number?

how to change the delay quantile spacings between two traffic classes while keeping the delay quantile spacings between other classes unchanged?

what happens with the delay quantile spacings if there are changes in traffic load?

if changes in load are detected, how should the numbers of reservations be adapted in order to keep the QoS?

A systematic, methodical approach is not feasible. As an example, consider a system with four traffic classes (M=4), thus, there are eight parameters. Imagine that running simulations with five different values for a parameter is sufficient to completely characterize the dependence of the delay quantiles (or delay quantile spacings) for all traffic classes on that parameter. Then, in order to identify dependence of delay quantiles on all parameters, $5^8$ (about 400,000) different simulations are needed, which would result in 400,000 delay distribution graphs to analyze. Suppose that one simulation lasts about one hour, the total simulation time would be roughly 45 years. Then, from the 400,000 delay distribution graphs, 1,600,000 delay quantiles and 1,200,000 delay quantile spacings would need to be extracted. Then, from this large number of data points, easy-to-use functions would need to be extracted.

Finally, note that the simulation method does not tackle the original problem. From the simulation data functions are derived describing the dependence of the delay quantile spacings on the numbers of reservations and loads:

$$\Delta_i^* = f_i^*(L_1, L_2, \ldots, L_M, N_1, N_2, \ldots, N_M),$$
$$i = 1, \ldots, M-1$$

The usable, practical problem, however, is how to set numbers of reservations as a function of quantile spacings and loads. Thus, the set of functions $f_i^*$, $i=1, \ldots, M-1$ needs to be inverted to get the functions $f_i$, $i=1, \ldots, M$.

Expressions can be derived for determining the working parameters ($N_i$, $i=1, \ldots, M$) for R-scheduling if targeted delay quantile spacings ($\Delta_i^*$, $i=1, \ldots, M-1$) between the traffic classes are given. Below the formulas are presented for systems where the numbers of arrivals per slot for each traffic class are independent and Poisson distributed, and where the service times (packet lengths) are equal to one slot.

The delay α-quantiles for small enough α are given by:

$$d_i^\alpha = \frac{\log \alpha}{r_{FIFO}} + c_1 + c_2 \cdot \sum_{j=1 \& j \neq i}^{M} N_j + C_3(L, RL_i) \cdot N_i \quad (3)$$

$$d_i^\alpha = \frac{\log \alpha}{r_{FIFO}} + c_1 + c_2 \cdot (N - N_i) + C_3(L, RL_i) \cdot N_i \quad (1b)$$

The constant $r_{FIFO}$ is the tail decay rate of the corresponding FIFO system and depends only on the total system load. The constants $C_1$ and $C_2$ have respective values 1.1 and 1.0. The value $C_3$ depends on the total system load (L) and on the relative load ($RL_i$) of traffic class i (see Table 1). The value $C_3$ is negative, as an increased number of reservations of class i, while all other parameters remain unchanged, increases the priority of that class and thus decreases the delay quantiles $d_i^\alpha$ of that class.

TABLE 1

Dependence of parameter $C_3$ on total load (L) and relative load (RL)

| relative load | 10% | 20% | 30% | 40% | 50% | 60% |
| --- | --- | --- | --- | --- | --- | --- |
| total load = 95% | −6.1 | −3.2 | −2.0 | −1.3 | −0.9 | −0.7 |
| total load = 90% | −4.7 | −2.7 | −1.7 | −1.2 | −0.8 | −0.6 |
| total load = 85% | −3.8 | −2.3 | −1.5 | −1.1 | −0.8 | −0.6 |

The (constant) delay quantile spacing for small enough α follows from the equations 1:

$$\Delta_i^* = C_2 \cdot (N_i - N_{i+1}) + C_3(L, RL_{i+1}) \cdot N_{i+1} - C_3(L, RL_i) \cdot N_i \quad (2)$$

Notice that the $i^{th}$ delay quantile spacing $\Delta_i^*$ depends linearly on the numbers of reservations of the traffic classes i and i+1. Setting the working parameters (numbers of reservations) in such a way to obtain predetermined delay quantile spacings, comprises solving a (limited) set of linear equations. Such a set of linear equations has one degree of freedom since there are M unknowns (numbers of reservations) to be determined and there are M−1 equations (delay quantile spacings).

The solutions of such a set of linear equations can be easily obtained with standard mathematical techniques. Choosing the number of reservations $N_M$ of traffic class M as a parameter, the numbers of reservations of the other traffic classes are:

$$N_i = \frac{1}{r_i} \cdot \left[ \sum_{j=i}^{M-1} \Delta_j^* + r_M \cdot N_M \right], i = 1, \ldots, M-1 \quad (3)$$

where $r_i = C_2 - C_3(L, RL_i)$.

The calculation of the numbers of reservations ($N_i$, $i=1, \ldots, M$) only requires a few basic mathematical operations (addition and multiplication). As a consequence, the numbers of reservations can be acquired almost instantaneously, which makes the proposed technique also suitable for dynamic applications.

The R-scheduling approach can be used to accomplish a temporally limited priority for isolating traffic classes from one another. The idea of temporal priority is to be understood as follows. Suppose a traffic class i with $N_i$ reservations that only this traffic class can use. If for some time, there is no incoming traffic of traffic class i, these reservations will slowly migrate to the head of the queue and remain there until a new burst of class-i traffic comes in. The first $N_i$ packets of this burst will seize the reservations in the front positions and therefore be scheduled prior to the other packets in the queue. However, for the remainder of the burst, the reservations will usually have less favourable positions. Hence, the priority is temporally limited in the sense that only the first $N_i$ packets of a burst receive quick scheduling. Additionally, the longer the absence of class-i traffic lasts, the further in the queue its reservations will be allowed to advance. The mechanism can thus be interpreted as granting a certain maximum priority credit to each of the traffic classes. If the arrival rate is high, the credit is gradually consumed and when depleted, no significant prioritisation is granted to the packets. Absence of traffic, however, gradually restores the priority credit up to its maximum. Clearly, the maximum priority credit of traffic class i is directly related to the number of reservations $N_i$ that are assigned to it.

In order to illustrate the performance of the proposed solution, some simulation results are now presented for a system with four traffic classes. The number of arrivals per slot for each traffic flow is Poisson distributed. All packets have the same length. The system load is 95%. The relative loads of the different packet flows are 10%, 20%, 30%, and 40%, respectively. Thus, the respective partial loads are: 9.5%, 19%, 28.5%, and 38%.

The numbers of reservations for each traffic class ($N_1$, $N_2$, $N_3$ and $N_4$) for this system vary from simulation to simulation. In all the figures, dots correspond to results from simulation and solid lines correspond to the aforementioned model expressed by means of equations 1 (with quantile dependence on a).

Figure 4:
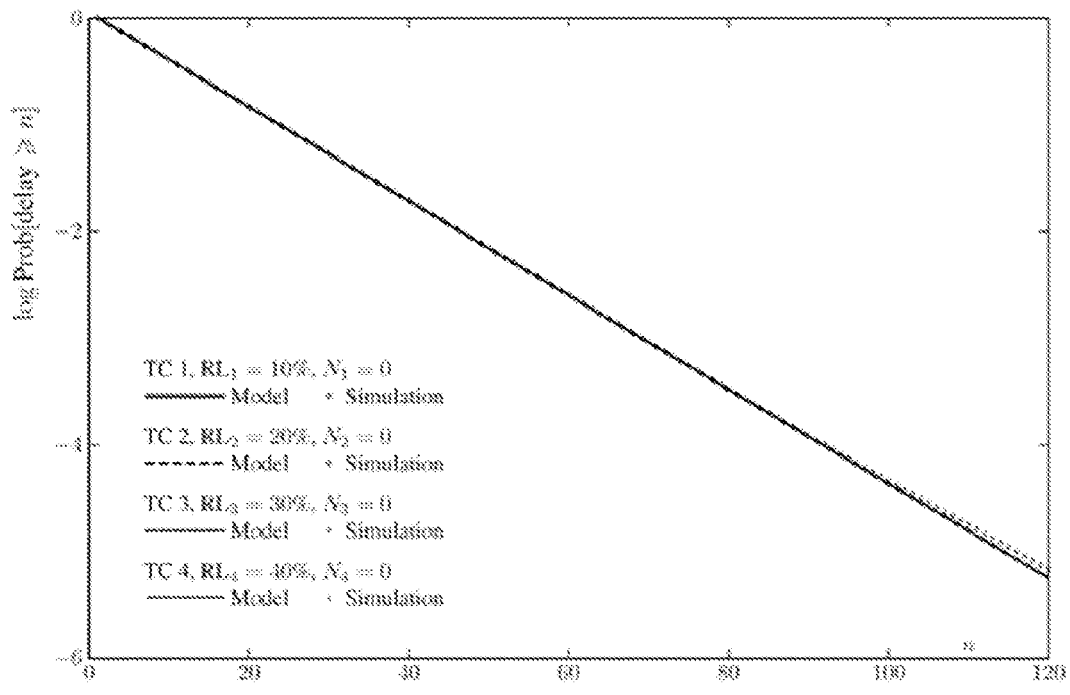
FIG. 4 illustrates the behaviour of a system without reservations (prior art).
Figure 5:
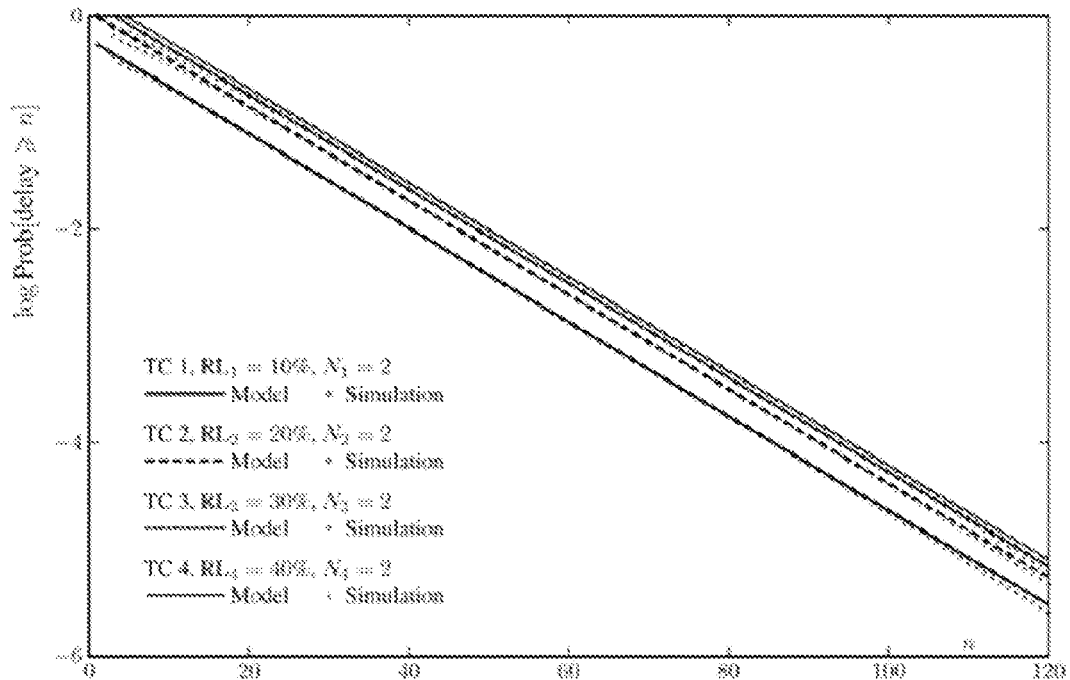
FIG. 5 illustrates the behaviour of a system with two reservations for each traffic class.

Without reservations (FIG. 4) the system behaves as a FIFO system, with no differentiation between the different traffic classes. From the moment reservations are introduced, differentiation between different traffic classes follows. Two examples are discussed where all traffic classes have the same number of reservations. In FIG. 5 all traffic classes have two reservations ($N_1=N_2=N_3=N_4=2$). Comparing two traffic classes with different partial loads, the reservations of the traffic class with the lower load are, on average, in lower positions (i.e. further in the queue, closer to the head of the queue) and thus an arriving packet of that traffic class will seize, on average, lower positions in the queue. Thus, for traffic classes with the same number of reservations, the lower the relative load $RL_i$ of a particular traffic class i, the lower its delay quantiles $d_i^\alpha$.

Figure 6:
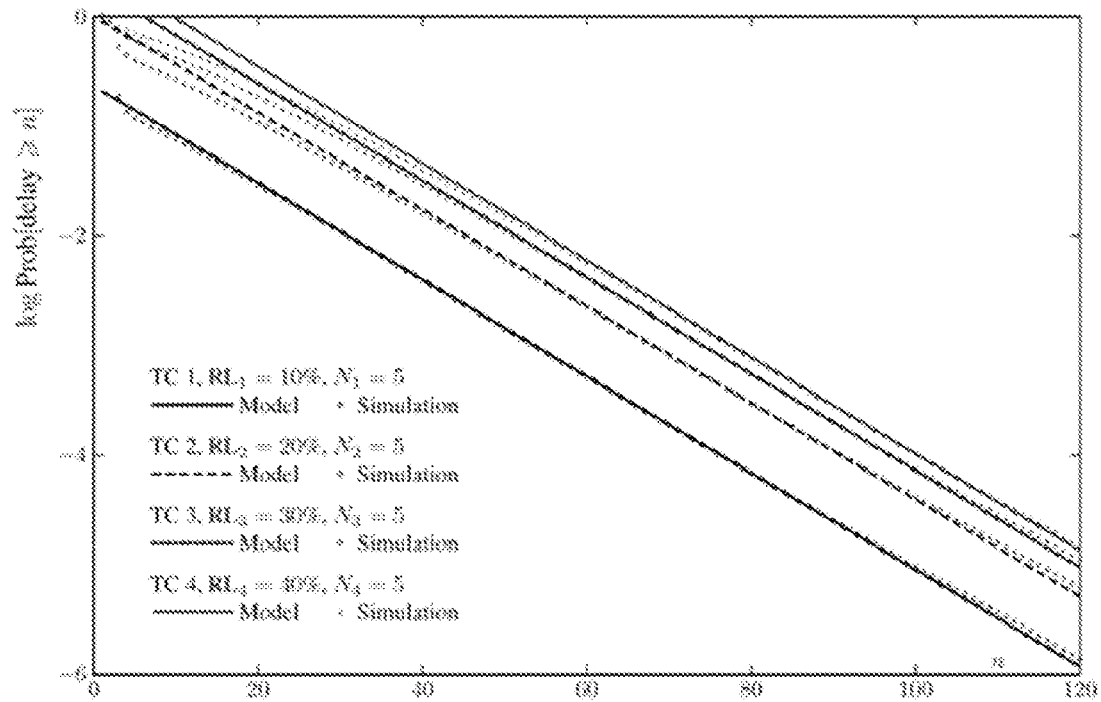
FIG. 6 illustrates the behaviour of a system with five reservations for each traffic class.

In FIG. 6, all traffic classes have five reservations ($N_1=N_2=N_3=N_4=5$). The delay quantile spacings are now a factor 2.5 larger than in FIG. 5. In general, if all the numbers of reservations are multiplied with the same factor, the delay quantile spacings increase with that factor.

Figure 7:
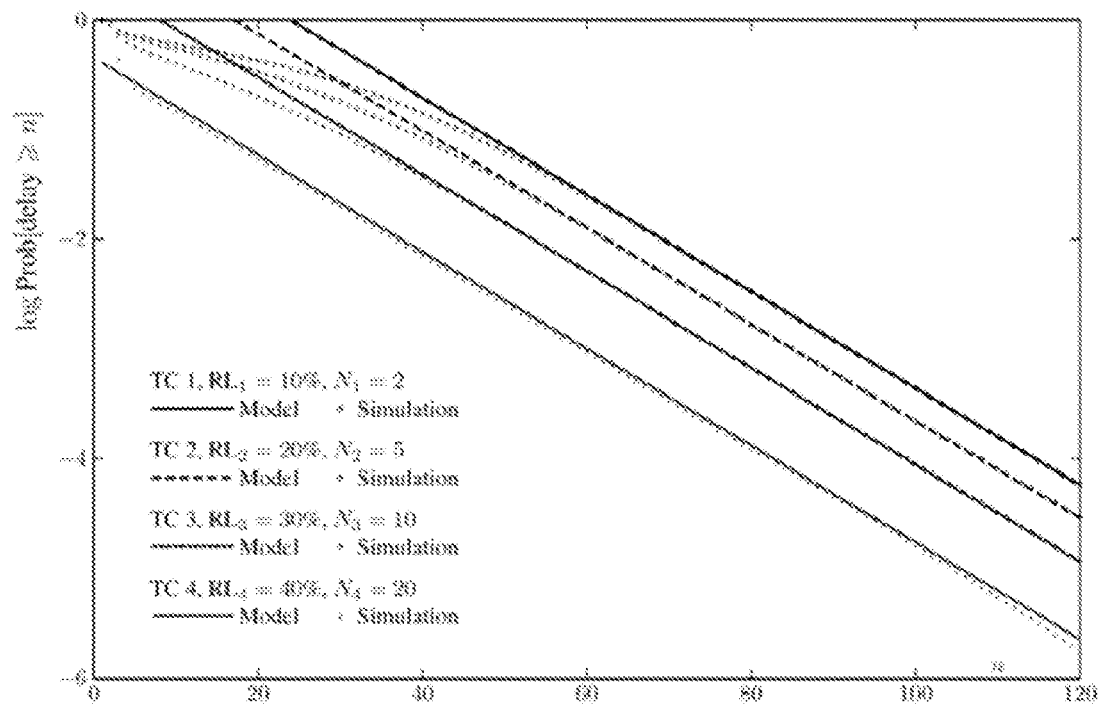
FIG. 7 illustrates the behaviour of a system with different numbers of reservations for each traffic class.

Increasing the number of reservations of a particular traffic class while keeping the numbers of reservations of the other classes, will decrease that traffic class's delay quantiles, and vice versa. In FIG. 7 the numbers of reservations of the different traffic classes have been tailored in such a way ($N_1=2$, $N_2=5$, $N_3=10$ and $N_4=20$) to inverse the 'natural' order: in this example the higher the relative load of a traffic class i, the lower its delay quantiles $d_i^\alpha$ (for small enough $\alpha$).

Figure 8:
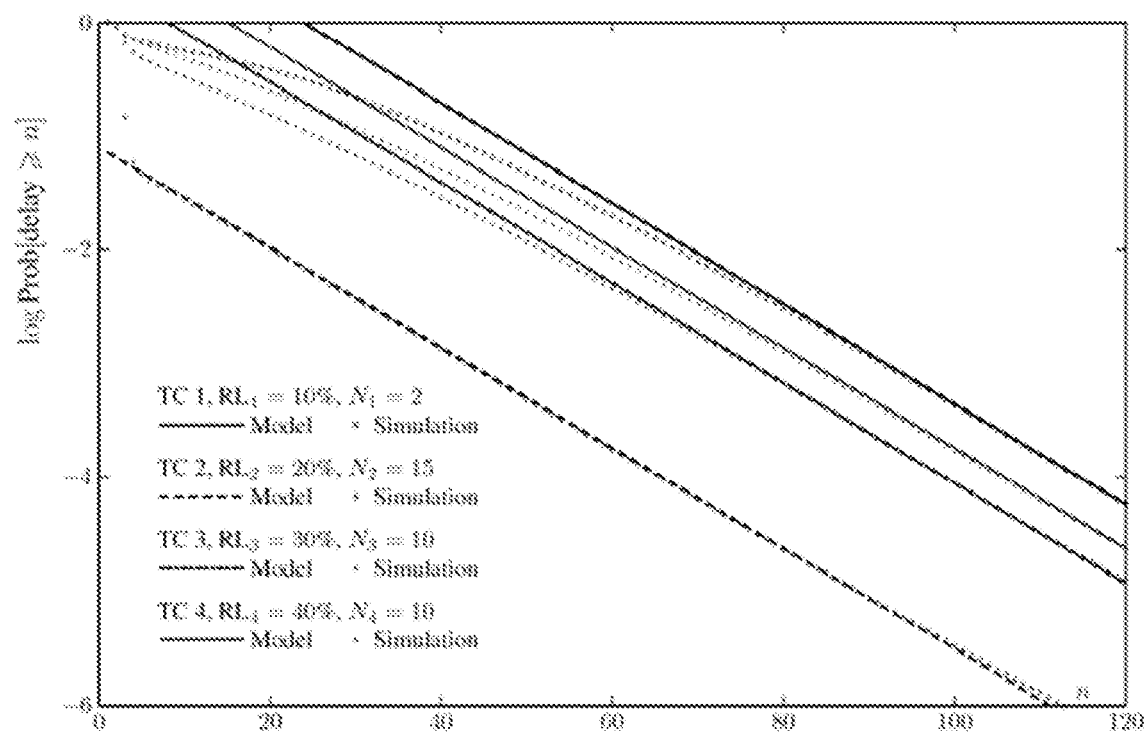
FIG. 8 illustrates the behaviour of a system with different numbers of reservations for each traffic class.

From equation 1b it follows that the tail behaviour of a traffic class i depends only on the number of reservations of that traffic class $N_i$ and the total number of reservations N. FIG. 8 illustrates this feature: compared to FIG. 7, only the number of reservations of traffic classes 2 and 4 are different, while the total number of reservations remains the same ($N_1=2$, $N_2=15$, $N_3=10$ and $N_4=10$). As a consequence, the tail behaviour of traffic classes 1 and 3 is the same in FIG. 7 and FIG. 8, i.e. for small enough □ their delay quantiles $d_i^\alpha$ remain the same.

Some important specific advantages offered by the scheduling according to the present invention are listed here below:

The proposed method of scheduling is very versatile in the number of configurations that can be chosen (number of classes M and the number of reservations $N_i$ (i=1, . . . , M) for each traffic class TC) and consequently, in the kinds of QoS differentiation that can be obtained. For instance, FIFO and absolute priority are limiting cases of R-scheduling, while it also allows for many other useful QoS trade-offs in between.

Even though the proposed method is very versatile, it is a simple algorithm. There is not one mathematical operation needed to enqueue or dequeue a packet.

Furthermore, all queueing and dequeueing operations can be performed with O(1) complexity.

The proposed scheduler is capable of achieving proportional delay quantile spacing. The R-scheduler aims at tailoring the per-class delay distributions in a specific way. These distributions have geometrically shaped tails, shifted relatively to each other by a specific amount. None of the prior-art solutions have this goal. The deadline-based schedulers are complex and aim at some hard upper bound for the delay that should never be crossed. AP targets the most extreme delay differentiation possible between the TCs and consequently is very rigid, cannot be controlled, and is vulnerable to starvation. The fair queueing schedulers aim for output rate proportionality instead of proportionality in the delay levels that are exceeded by TC i with probability α.

The proposed solution can be used to grant a traffic class very fast access to the transmitter for limited bursts of packets. The longer a TC abstains from sending packets before the burst, the faster the burst will be processed.

In prior-art solutions the differentiation is decided at the moment packets are dequeued. With the proposed R-scheduling however, as a consequence of storing all data packets and reservations in the same queue, the differentiation is essentially realised much earlier, i.e. at the moment when packets are enqueued.

Calculating the parameters (numbers of reservations for each class) only requires elementary mathematical knowledge. If there are changes in the system (new QoS requirements, changes in number of traffic classes, variations in load), new parameters are calculated in a flash. Therefore, the proposed scheduler is suitable for dynamic applications.

The scheduling approach as disclosed in this invention can be readily implemented in networking equipment of all sorts: routers, switches, gateways and (wireless) access points. Depending on the intended usage and the purpose of the device in question, the scheduling capabilities can be implemented either in substitute of traditional multi-class scheduling solutions (e.g. absolute priority, deficit Round-Robin, . . . ) or complementary to these prior solutions.

Although the main applications of the approach of the present invention may be found in the handling of data requests, queries, transactions, prioritising processes and/or threads and/or network traffic, it will be apparent to the skilled person that the same concepts can readily be applied e.g. in enqueueing physical items (manufacturing, packaging, distribution).

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude

The invention claimed is:

1. A method for scheduling data traffic in a network node, said data traffic being divided into a plurality of data traffic classes, the method comprising the steps of:
   detecting to which data traffic class an incoming data packet belongs,
   storing said incoming data packet in a memory and adjusting a single queue associated with said memory to rank said incoming data packet in said single queue between a head of the queue and a tail of the queue, said single queue having for at least one data traffic class a number of reserved positions for arriving data packets of said at least one data traffic class, said incoming data packet taking in said single queue a position corresponding to one of said reserved positions or, if no reserved position is available, taking a position at the tail of said single queue, and
   taking a data packet referred to at the position closest to said head of the queue for transmission,
   wherein a step is performed of determining said number of reserved positions of said at least one data traffic class according to a given Quality-of-Service requirement relating to a queueing delay distribution of data packets of said at least one data traffic class having reserved positions in said single queue, said Quality-of-Service requirement is expressed as a targeted delay quantile spacing between data traffic classes of said plurality,
   wherein said number of reserved positions is determined as a function of said delay quantile spacing and the partial load of said data traffic classes, and
   wherein a new reserved position is created at a free position towards the tail of said queue when a position corresponding to one of said reserved positions is taken if said incoming data packet belongs to said at least one traffic class having reserved positions, so that the number of reserved free positions for that class remains constant.

2. The method for scheduling data traffic as in claim 1, wherein instead of said delay quantile spacings, spacings between per traffic class mean delays are used.

3. The method for scheduling data traffic as in claim 1, wherein said position corresponding to one of said reserved positions is the available reserved position closest to the head of said single queue.

4. The method for scheduling data traffic as in claim 1, wherein before said step of storing and adjusting a step is performed of queueing delay estimation for said incoming data packet, yielding a piece of congestion information.

5. The method for scheduling data traffic as in claim 4, wherein said queueing delay estimation comprises an upper bound and a lower bound estimate.

6. A program, executable on a programmable device containing instructions, which, when executed, perform the method as in claim 1.

7. A device for scheduling data traffic in a network node, said data traffic being divided into a plurality of data traffic classes, the device comprising:
   a memory for storing an incoming data packet,
   a single queue associated with said memory arranged to rank said incoming data packet between a head of the queue and a tail of the queue, said single queue having for at least one data traffic class a number of reserved positions for arriving data packets of said at least one data traffic class, whereby said incoming data packet takes in said single queue a position corresponding to one of said reserved positions or, if no reserved position is available, a position at the tail of said single queue, and
   a controller arranged to detect to which data traffic class said incoming data packet belongs, for enqueueing said incoming data packet in said memory and for selecting a data packet referred to at the position closest to said head of the queue for transmission over an output link,
   wherein that said controller is further arranged for determining said number of reserved positions of said at least one data traffic class according to a given Quality-of-Service requirement relating to a queueing delay distribution of data packets of said at least one data traffic class having reserved positions in said single queue, said Quality-of-Service requirement being expressed as a targeted delay quantile spacing between data traffic classes of said plurality,
   wherein said controller is arranged for determining said number of reserved positions as a function of said delay quantile spacing and the partial load of said data traffic classes, and
   wherein said controller arranged for creating a new reserved position at a free position towards the tail of said queue when a position corresponding to one of said reserved positions is taken if said incoming data packet belongs to a traffic class having reserved positions, so that the number of reserved free positions for that class remains constant.

8. The device for scheduling data traffic as in claim 7, wherein said controller is adapted for deriving parameter settings from said given Quality-of-Service requirement and for determining said number of reserved positions based on said derived parameter settings.

9. The device for scheduling data traffic as in claim 7, wherein said controller is further adapted for performing a queueing delay estimation for said incoming data packet.

* * * * *